INVENTOR
ARTHUR W. CATLIN
BY *Arthur R. Woolfolk*
ATTORNEY

July 26, 1949.　　　A. W. CATLIN　　　2,477,287
RECUPERATOR CONSTRUCTION

Filed Nov. 7, 1946　　　　　　　　　　3 Sheets-Sheet 2

INVENTOR
ARTHUR W. CATLIN

BY
ATTORNEY

July 26, 1949. A. W. CATLIN 2,477,287
RECUPERATOR CONSTRUCTION
Filed Nov. 7, 1946 3 Sheets-Sheet 3

INVENTOR
ARTHUR W. CATLIN
BY
Arthur R. Woolfolk
ATTORNEY

Patented July 26, 1949

2,477,287

UNITED STATES PATENT OFFICE 2,477,287

RECUPERATOR CONSTRUCTION

Arthur W. Catlin, Manitowoc, Wis., assignor to Manitowoc Shipbuilding Company, Manitowoc, Wis.

Application November 7, 1946, Serial No. 708,355

8 Claims. (Cl. 263—16)

This invention relates to a recuperator construction for a rotary kiln and is particularly directed to a liner and girder construction for the recuperator section of a kiln.

In kilns, such as cement kilns, it is the usual practice to preheat the combustion air by blowing the incoming air through the hot clinkers adjacent the discharge end of the kilns to thereby quench the clinkers and preheat the air. In kiln construction, such as cement kilns, it has heretofore been the usual practice to provide liner structures supported by I-beams and on sub-frames which were in the form of inverted channels, but difficulty was encountered in matching the required number of liner structures with the circumferential space allowed when any particular size of I-beam was employed. It frequently happened that small fragments of clinkers found their way into the sub-frames forming the air ducts and, due to the liner plate construction previously used, were trapped in these ducts and plates and could not come out and, therefore, the ducts eventually became heavily loaded with such particles. Another defect in the previously used constructions was that the I-beams frequently buckled. In certain constructions where spaces existed between successive liner structures, such space was heretofore filled with refractory material, but this space was merely waste space.

This invention is designed to provide a liner construction and a beam construction for a rotary kiln which are so made that a high volumetric efficiency for the air is obtained on the one hand, and yet on the other hand are so made that whatever small amount of clinkers pass through the liner construction and are held either in the liner structure itself or in the air ducts, are automatically discharged back into the kiln as the kiln rotates so that there is substantially no accumulation of clinkers in the air ducts or liner structures, and in which means are provided whereby the amount of small clinkers that temporarily enter a liner structure is greatly reduced, and in which provision is made whereby burning away of either the liner structures or the supporting girders or beams is prevented in a very effective manner without the use of any refractory material.

Further objects are to provide a liner and girder construction for a rotary kiln which are so made that the girder may be made any height desired for the symmetrical spacing of a given number of liner structures around the inner circle of the kiln and to so make the girder that it is anchored at its inner or hot end only and is allowed to float adjacent its outer end, whereby buckling is avoided, and to provide a series of alloy bars which are welded to the inner end of the girder web and protect the girder web from damage from heat and at the same time provide a cooperating structure in the liner members so that these alloy bars are themselves cooled by a blast of air.

In previous constructions, there was found to be a considerable obstruction of the air flow from the air ducts into the kiln and this constriction necessarily contributed to the overheating of the previously known liner structures.

In general terms, further objects of this invention are to provide a liner and girder construction which are so made that the maximum unobstructed air passage is provided from the air ducts through the liner structures, in which the space between successive girders is unobstructed and the incoming combustion air arrives without obstructions at the bottom of the liner plate structures, in which any small clinkers that may enter the liner structures and air ducts are automatically, periodically discharged during the rotation of the kiln, and in which provision is made to insure adequate cooling of all parts subjected to the intense heat of the clinkers.

An embodiment of the invention is shown in the accompanying drawings in which.

Figure 5:
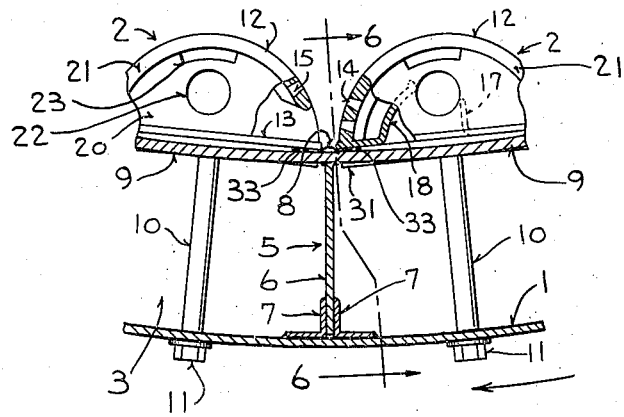
Figure 5 is a view of a fragment of the kiln showing the liner and girder structures in place, such view being taken at right angles to the axis of the kiln and being partly broken away and partly in section, such view corresponding to a section on the line 5—5 of Figure 6.
Figure 6:
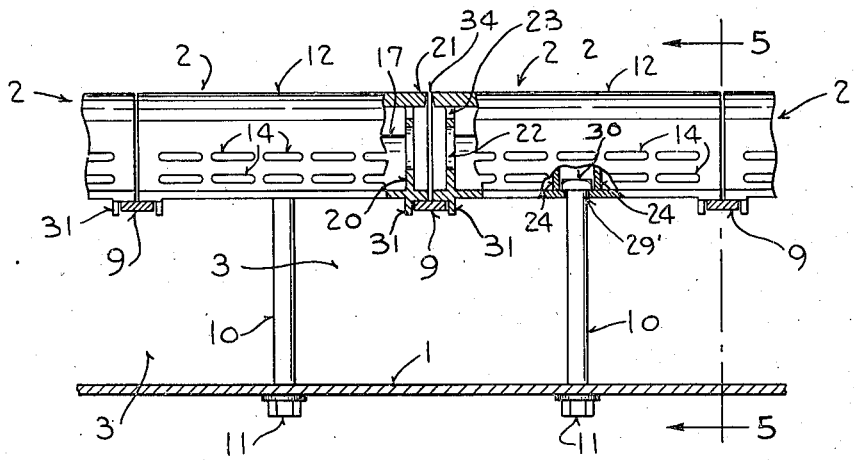
Figure 6 is a sectional view on the line 6—6 of Figure 5.
Figure 7:
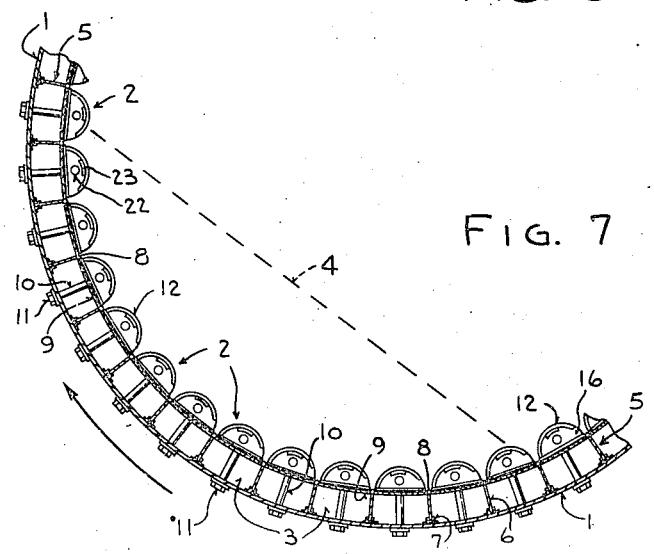
Figure 7 is a small fragmentary view of a portion of the recuperator section of a kiln with the liner and girder structures in place, such view showing in dotted lines the position of the clinker load as the kiln rotates.

Referring to the drawings, it will be seen that the outer shell or drum of the kiln is indicated by the reference character 1, see Figures 5, 6, and 7. The liner structures are indicated generally by the reference character 2. These liner structures are placed in the discharge end of a kiln and are adapted to have air blown through them from the air ducts 3 through the hot clinkers while the liner structures are beneath the clinker load as indicated at 4 in Figure 7, suitable means of a well known type, not shown, being provided to cut off the supply of air from the air ducts when the liners opening thereinto are not beneath the clinker load. Any suitable structure of a well known type may be employed for this purpose.

Figure 9:
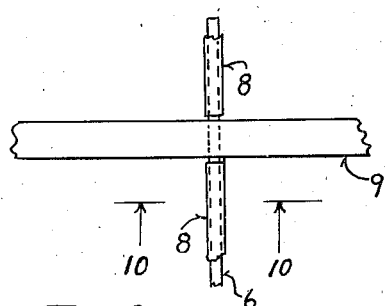
Figure 9 is a fragmentary view showing only a portion of a girder and a portion of one of the ring structures and parts of adjacent heat resisting bars.
Figure 10:
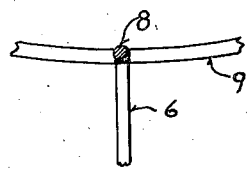
Figure 10 is a sectional view on the line 10—10 of Figure 9.

A series of longitudinally extending girders indicated generally by the reference character 5 divide the space between the liner structures 2 and the outer shell 1 of the kiln at the recuperator end into a series of longitudinally extending air ducts. The girder structure comprises a web 6 which is positioned between two longitudinally extending angle irons 7 welded or otherwise secured to the shell 1 and receiving the outer end of the girder web 6 between them. The girder web is not anchored at its outer end but floats between the angle irons 7 and is in approximate contact with the outer shell 1. The inner end of each of the girders has welded thereto a series of heat resisting alloy bars 8 which are arranged in spaced relation, see Figures 9 and 10. In the spaces between the successive bars 8, a series of continuous ring sections 9 are welded directly to the webs 6 of the girder structure. Bolts 10 extend through the outer shell 1 of the kiln and hold the liner structures 2 firmly in place against the supporting ring sections 9 in a manner hereinafter described, such bolts being provided with external nuts 11 whereby they may be tightened.

From the description thus far given, it is apparent that the number of liner structures 2 that may be desired for a given peripheral distance is predetermined and thereafter the height of the girder web 6 is made so as to provide this exact circumferential distance to accommodate the selected number of liner structures.

Figure 1:
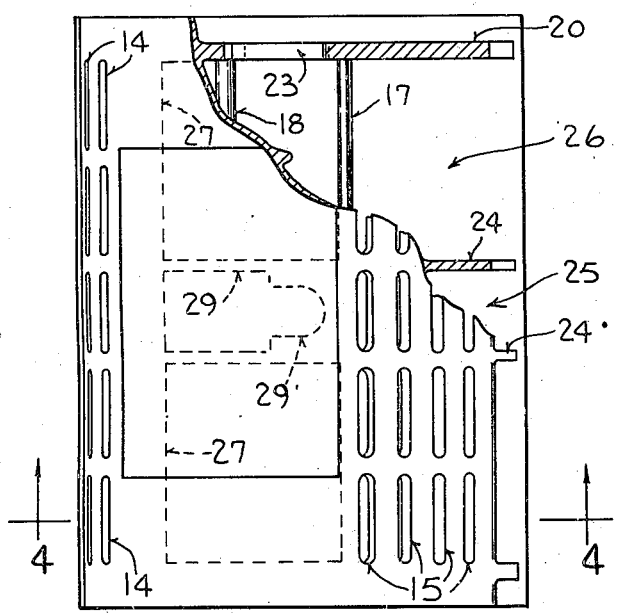
Figure 1 is a view looking directly down on a liner structure, such view being partly broken away and partly in section.
Figure 2:
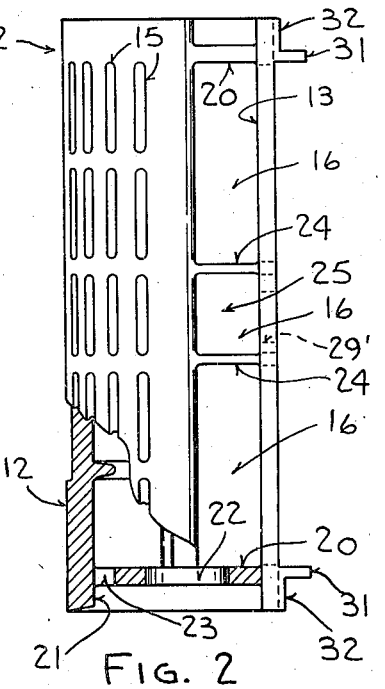
Figure 2 is a side elevation of the structure shown in Figure 1 with parts broken away and parts in section.
Figure 3:
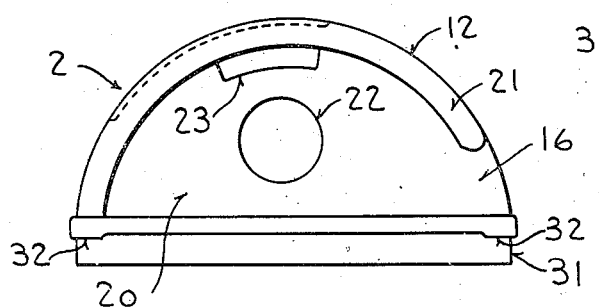
Figure 3 is an end view of Figure 1.
Figure 8:
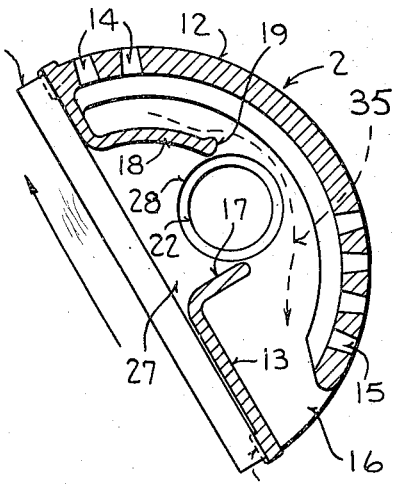
Figure 8 is a view corresponding to Figure 4 showing the position of a liner structure while it is on the ascending side of the rotary kiln.
Figure 4:
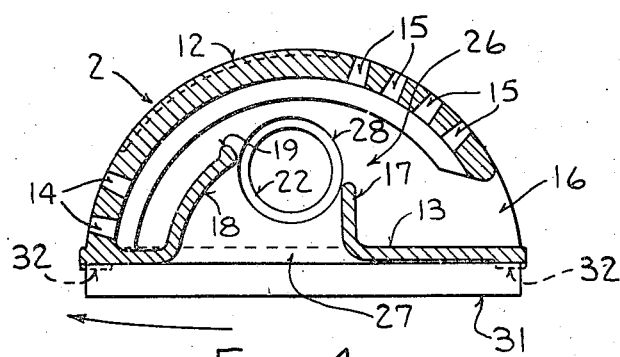
Figure 4 is a sectional view taken on the line 4—4 of Figure 1 showing the liner construction in a horizontal position.

The liner structures are duplicates and a description of one will, therefore, suffice. Referring particularly to Figures 1 through 4 it will be seen that the liner structure is an arched member having a roof portion or arched portion 12 and a bottom wall or floor portion 13. The roof portion 12 is provided with two rows of narrow slots 14 on the leading side and a plurality of rows of narrow slots 15 on the trailing side and with a relatively large opening or slot 16 on the trailing side between the arched portion 12 and the floor plate or bottom 13. Further it will be seen that the floor or bottom portion 13 is provided with a relatively short upstanding ledge or trailing baffle 17 which is slightly towards the trailing side with reference to the center line of the liner structure. It is also provided with a relatively long curved leading baffle 18 located towards the leading side of the liner structure, and the baffle 18 is preferably provided with a rounded marginal edge or hump 19 for a purpose hereinafter to appear. The liner structure is provided with end walls 20 and with end flanges 21 which form, in reality, extensions of the arched roof or top portion 12. The end walls 20 are provided with relatively large openings 22 and with relatively narrow elongated arcuate slots 23, both for the discharge of air and for cooling the overhanging portions of the roof. The liner structures are divided by means of a pair of internal partitions 24 so as to provide a central air chamber 25 and two outer air chambers 26. The air chambers 26 communicate with the air ducts 3, see Figures 5, 6, and 7, by means of large openings 27 formed in the bottom wall 13 of the liner structures between the baffles 17 and 18, as shown in Figures 1, 4, and 8. Air passes to the inner air chamber 25 by means of relatively large circular openings 28 formed in the intermediate walls 24 of the liner structure, and in addition to this, a quantity of air also flows into the central chamber 25 through the relatively large opening 29 provided for the passage of the head 30 of the bolt 10, see Figure 1 for the opening 29, and Figure 6 for the bolt head 30. The bolt head is freely passed through the opening 29 during assembly and is moved laterally so that the shank of the bolt 10 is positioned within the slot 29' of the opening 29. The head 30 of the bolt 10 is prevented from turning when the nut 11 is tightened, see Figure 6, as the head of the bolt fits between the webs or intermediate walls 24 of the liner structure, as shown in Figure 6, sufficient clearance of the head and shank of the bolt being provided for expansion and contraction due to heating and cooling.

The liner structures 2 are provided with small downwardly projecting flanges 31 which are positioned between the rings or ring sections 9 and thus definitely locate the the liner structures axially of the kiln and prevent shifting of the liner structures. The flanges 31 extend downwardly sufficiently to engage the girders 5 and thus additionally serve to prevent circumferential shifting of the liner structures. In addition to this, it is to be noted that small pads or feet indicated at 32 are provided on the under side of the bottom wall 13 of the liner structures so as to provide a small slot 33, see Figure 5, on each side of each bar 8 to thus direct a blast of cooling air against the bar from opposite sides and prevent burning of the bar. From this construction it will be seen that the liner structures are supported at their ends only.

The liner structures 2 are arranged in rows with a slight space 34 between successive liner members or structures, see Figure 6. These small spaces 34 are left between successive liner structures to allow for expansion. The slots 34 and the slots 33 provide additional air discharge space or openings in the structure and thus increase the volumetric capacity besides serving their cooling function. In addition to this, the air is blown through the leading openings 14 and the trailing openings 15 and the opening 16, see Figure 4, and thus a very large free flow of air is provided by this liner construction. Also it is to be noted that the skirts or webs 31 of the liner structures close the space between the curved ring sections 9 and the straight bottom walls 13 of the liner structures as shown in Figure 5.

It is to be noted particularly that the air discharge openings 14 and 15 of the liner structure are elongated slots which extend at right angles to the direction of clinker flow. The direction of clinker flow is peripherally of the rotating kiln and is, therefore, directly across the narrow elongated slots 14 and 15. It has been found that if the heretofore known practice of providing slots extending longitudinally of the clinker flow was followed, that small clinkers will ultimately block a substantial part of these slots. However, by providing the elongated slots transversely of the clinker flow, it has been found that very little passage of clinkers through the slots occur and that practically no blinding or stopping of the slots results. Also it is to be noted that the air slots or air vents 14 and 15 taper inwardly so as to prevent clogging by any clinkers that may pass through their outer narrowest portions.

It is to be noted from a comparison of Figures 4 and 8 that as the kiln rotates in the direction of the arrows in Figures 4, 8, and 7, that any clinkers that may enter the leading air slots 14 are temporarily lodged in front of the curved baffle 18 and as the kiln rotates further, these small clinkers are discharged in the direction of the arrow 35, see Figure 8, over the baffle 17 and are thus discharged through the large discharge opening 16. It is to be noted that the hump or the enlargement 19 on the curved baffle 18 helps to keep the clinkers from spilling over into the air duct. However, when the clinkers are discharged they pass over the hump with considerable velocity and are discharged through the opening 16, see arrow 35 in Figure 8. The discharge opening 16 thus serves a dual purpose as a clinker discharge opening on the one hand, and as a large air vent opening which provides a blast of air directly outwardly against the leading portion of the next successive liner member or structure.

Figure 11:
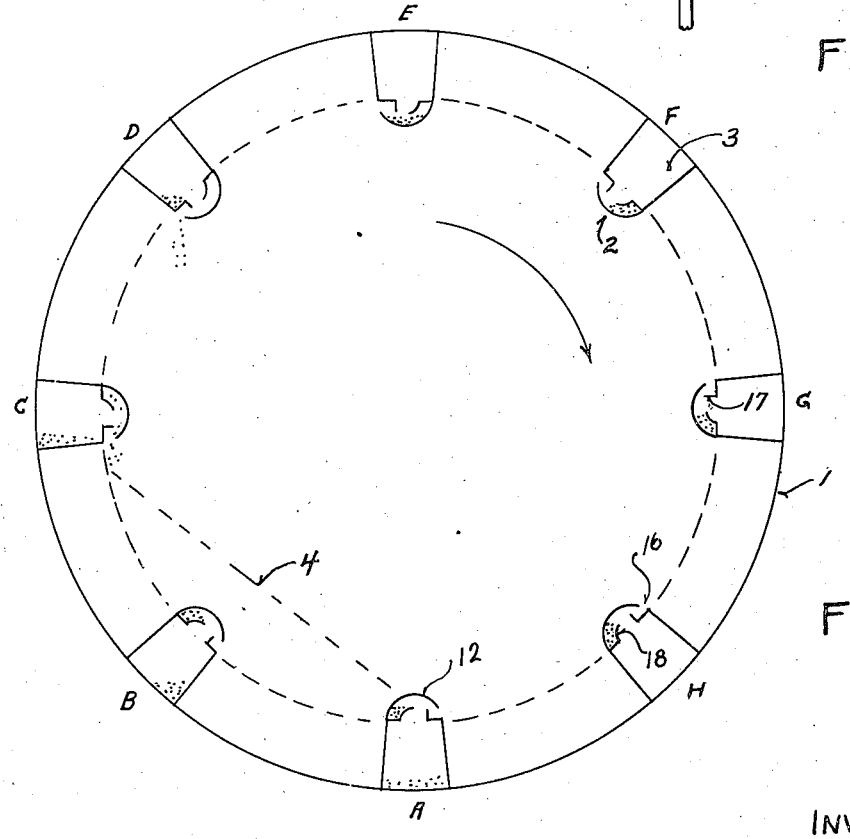
Figure 11 is a diagrammatic view very much exaggerated showing the manner in which the clinkers which are forced through the liner structures are discharged automatically back into the kiln as the kiln rotates.

Figure 11 has been drawn in an exaggerated manner with the size of the liner structures and air ducts out of proportion to the actual diameter of the kiln and with only a few shown in different positions around the kiln to more clearly show the action of the apparatus.

Referring to Figure 11 it will be seen that when a liner structure indicated generally by the reference character 2 enters beneath the clinker load that the pressure of the clinkers forces some smaller clinkers into the liner structure and into the air duct 3. This condition is shown at A and B. As the kiln rotates and the liner structure passes across and beyond the approximate horizontal diameter of the kiln, such clinkers as are held in the pocket of the liner structure between the roof 12 and the curved baffle 18 are discharged into the kiln and the clinkers in the air duct collect on the now lower side of the air duct, as shown at C and D. Further rotation of the kiln causes the clinkers in the air duct to discharge into the liner structure and rest on the inner side of the inverted roof of the liner structure as shown at E. As the kiln rotates these last mentioned clinkers pass into the pocket of the liner structure formed by the roof 12 and the curved baffle 18 and are retained therein through the positions F, G, H, A, and B until they are discharged at C and D as previously described.

The baffles 17 and 18 keep a good part of the clinkers which are forced through the liner structures from entering the air ducts, but even such clinkers as do enter the air ducts are also periodically discharged into the kiln as the kiln rotates.

It will be apparent from the above description that this invention provides a novel liner structure for recuperators which not only periodically discharges clinkers which temporarily collect in the liner structures, but which also coacts with the air ducts to periodically discharge such clinkers as temporarily collect in the air ducts.

It will be seen that a novel recuperator construction has been provided by this invention, which is so made that the supporting girders are protected from the intense heat of the hot clinkers and are prevented from warping and in which a very large and unobstructed flow of air is provided, whereby the air quenches or cools the hot clinkers and is itself preheated as it enters the kiln, thus providing a very effective recuperator action.

It will be seen further that the liner structures or members are securely anchored in place in a very simple manner and are braced or locked against shifting either axially or circumferentially of the kiln, and that these liner structures are relatively simple to make and are very easy to assemble within a kiln.

Further it will be seen that the floating girder construction coacting with the liner structures makes it possible to select a predetermined number of liner members or liner structures for a given circumferential distance within the kiln and thereafter to select the girder width so that the girders exactly accommodate the selected number of liner structures.

Further the floating type of girder, that is to say floating on its outer edge with reference to the shell of the kiln, prevents buckling of the girder and the adequate cooling of the protecting alloy bars on the inner end of the girder webs also materially aiding in preventing undue heating and buckling of the girder.

Although this invention has been described in considerable detail, it is to be understood that such description is intended as illustrative rather than limiting, as the invention may be variously embodied and is to be interpreted as claimed.

I claim:

1. A liner construction for a recuperator for a rotary kiln comprising a series of arched, hollow members each having a floor provided with at least one air inlet opening and having an arched roof provided with a series of air outlet openings, each member having a leading baffle located internally and in front of the air inlet opening with reference to the direction of rotation of the kiln and a trailing baffle located internally and rearwardly of the air inlet opening with reference to the direction of rotation of the kiln, said leading baffle when on the ascending side of the rotary kiln being arranged to discharge clinkers over and behind the trailing baffle, each member having a discharge slot for the clinkers adjacent the floor at the trailing side of the member.

2. A liner construction for a recuperator for a rotary kiln comprising a series of arched, hollow members each having a floor provided with at least one air inlet opening and having an arched roof provided with a series of air outlet openings, each member having a leading baffle located internally and in front of the air inlet opening with reference to the direction of rotation of the kiln and a trailing baffle located internally and rearwardly of the air inlet opening with reference to the direction of rotation of the kiln, said leading baffle being curved and approximating the curve of the arched roof, said leading baffle when on the ascending side of the rotary kiln being arranged to discharge clinkers over and behind the trailing baffle, each member having a discharge slot for the clinkers adjacent the floor at the trailing side of the member.

3. A liner construction for a recuperator for a rotary kiln comprising a series of arched, hollow members each having a floor provided with at least one air inlet opening and having an arched roof provided with a series of air outlet openings, each member having a leading baffle located internally and in front of the air inlet opening with reference to the direction of rotation of the kiln and a trailing baffle located internally and rearwardly of the air inlet opening with reference to the direction of rotation of the kiln, said leading baffle being curved and approximating the curve of the arched roof, and having an upwardly projecting enlarged marginal edge, said leading baffle when on the ascending side of the rotary kiln being arranged to discharge clinkers over and behind the trailing baffle, each member having a discharge slot for the clinkers adjacent the floor at the trailing side of the member.

4. A recuperator construction for a rotary kiln comprising a series of rings of arched, hollow liner members having roofs arched about an axis paralleling the axis of the kiln, and having end flanges and apertured end walls with the end flanges of adjacent members of succeeding members spaced apart, ring members carried internally of the kiln on which adjacent ends of the members in succeeding rings rest, said members having floors provided with apertures for the admission of air and having a series of outlet apertures in their arched roofs, said kiln having an outer shell, girder members extending longitudinally of the kiln to provide air ducts and arranged to support said ring members, and bolts extending through said shell and the floor of said liner members to hold said liner members in place, said bolts having clearance with reference to the floor of the liner members.

5. A recuperator construction for a rotary kiln comprising a series of rings of arched, hollow liner members having roofs arched about an axis paralleling the axis of the kiln, and having end flanges and apertured end walls with the end flanges of adjacent members of succeeding members spaced apart, ring members carried internally of the kiln on which adjacent ends of the members is succeeding rings rest, said members having floors provided with apertures for the admission of air and having a series of outlet apertures in their arched roofs, said kiln having an outer shell, girder members extending longitudinally of the kiln to provide air ducts and arranged to support said ring members, and bolts extending through said shell and the floor of said liner members to hold said liner members in place, said bolts having clearance with reference to the floor of the liner members, said girder members having a floating connection at their outer edges with the shell of said kiln.

6. A recuperator construction for a rotary kiln comprising a series of rings of arched, hollow liner members having roofs arched about an axis paralleling the axis of the kiln, and having end flanges and apertured end walls with the end flanges of adjacent members of succeeding members spaced apart, ring members carried internally of the kiln on which adjacent ends of the members in succeeding rings rest, said members having floors provided with apertures for the admission of air and having a series of outlet apertures in their arched roofs, said kiln having an outer shell, girder members extending longitudinally of the kiln to provide air ducts and arranged to support said ring members, and bolts extending through said shell and the floor of said liner members to hold said liner members in place, said bolts having clearance with reference to the floor of the liner members, said girder members having a floating connection at their outer edges with the shell of said kiln, and each having a heat protecting bar at the inner edge of the girder member, said liner members having means for directing blasts of air against said heat protecting bars to cool said bars.

7. A recuperator construction for a rotary kiln comprising a series of rings of arched, hollow liner members having roofs arched about an axis paralleling the axis of the kiln, and having end flanges and apertured end walls with the end flanges of adjacent members of succeeding members spaced apart, ring members carried internally of the kiln on which adjacent ends of the members in succeeding rings rest, said members having floors provided with apertures for the admission of air and having a series of outlet apertures in their arched roofs, said kiln having an outer shell, girder members extending longitudinally of the kiln to provide air ducts and arranged to support said ring members, bolts extending through said shell and the floor of said liner members to hold said liner members in place, said bolts having clearance with reference to the floor of the liner members, and a series of angle irons secured to the inner side of the shell and extending longitudinally of the shell and arranged in closely spaced pairs, the outer longitudinal edges of the girder members being received between adjacent pairs of angle irons and being movable with respect to the angle irons, whereby said girder members have a floating connection with said shell.

8. A recuperator construction for a rotary kiln comprising a series of rings of arched, hollow liner members having arched roofs provided with openings therein and having floors provided with relatively large openings for the admission of air to the liner members, a plurality of air ducts located below the liner members for supplying air to the liner members, said liner members having discharge openings on their trailing sides with reference to the direction of rotation of the kiln, said liner members each having interior baffles extending from the floor towards the roof of such liner members, one of said baffles forming a pocket with the roof of the liner, said liner members coacting with said air ducts to receive clinkers temporarily lodged in the air ducts when the liner members are in inverted position at the upper side of the rotating kiln and being arranged to discharge said clinkers through the opening in the trailing side of the liner members during the rotation of said kiln, whereby said liner members and said air ducts coact to prevent accumulation of clinkers in said air ducts.

ARTHUR W. CATLIN.

REFERENCES CITED

The following references are of record in the file of this patent:

UNITED STATES PATENTS

| Number | Name | Date |
| --- | --- | --- |
| 2,132,709 | Vanderwerp | Oct. 11, 1938 |
| 2,132,710 | Vanderwerp | Oct. 11, 1938 |
| 2,265,556 | Vanderwerp | Dec. 9, 1941 |